United States Patent
Hawkins et al.

(10) Patent No.: US 7,862,065 B2
(45) Date of Patent: Jan. 4, 2011

(54) ADJUSTABLE LENGTH BICYCLE MOUNTABLE HAND PUMP

(75) Inventors: Eric Hawkins, Lake Elmo, MN (US); Pierre A. G. Ostor, White Bear Lake, MN (US); John Krawczyk, Woodbury, MN (US)

(73) Assignee: Bicycle Tools Incorporated, St. Paul, MN (US)

( * ) Notice: Subject to any disclaimer, the term of this patent is extended or adjusted under 35 U.S.C. 154(b) by 521 days.

(21) Appl. No.: 11/846,752

(22) Filed: Aug. 29, 2007

(65) Prior Publication Data

US 2009/0060766 A1 Mar. 5, 2009

(51) Int. Cl.
*B62J 9/00* (2006.01)

(52) U.S. Cl. ............ 280/288.4; 92/58.1; 417/234; 417/552

(58) Field of Classification Search .......... 280/288.4; 92/58.1; 417/234, 235, 552, 554
See application file for complete search history.

(56) References Cited

U.S. PATENT DOCUMENTS

| | | | |
|---|---|---|---|
| 1,319,137 A | 10/1919 | Black | |
| 3,981,625 A | 9/1976 | Wickenberg | |
| 4,120,614 A | 10/1978 | Bouder | |
| 4,569,275 A | 2/1986 | Brunet | |
| 5,011,055 A * | 4/1991 | Neugent | 224/449 |
| 5,197,795 A | 3/1993 | Mudrovich | |
| 5,347,913 A * | 9/1994 | Stepner | 92/58.1 |
| 5,715,554 A | 2/1998 | Downs et al. | |
| 6,017,196 A * | 1/2000 | Wu | 417/234 |
| 6,120,258 A | 9/2000 | Chen | |
| 6,328,057 B1 * | 12/2001 | Wang | 137/231 |
| 6,464,477 B1 | 10/2002 | Wu | |
| 6,506,026 B2 | 1/2003 | Wu | |
| 6,615,704 B2 * | 9/2003 | Chuang | 92/58.1 |
| 6,736,618 B2 | 5/2004 | Wu | |
| 6,817,060 B2 * | 11/2004 | Huang et al. | 16/111.1 |
| 6,953,326 B2 * | 10/2005 | Wang | 417/234 |
| 7,063,521 B2 * | 6/2006 | Huang et al. | 417/572 |
| 2001/0031211 A1 * | 10/2001 | Wu | 417/468 |
| 2005/0146113 A1 * | 7/2005 | Anderson et al. | 280/288.4 |
| 2006/0198154 A1 * | 9/2006 | Naylor | 362/473 |
| 2007/0148024 A1 * | 6/2007 | Wu | 417/556 |
| 2008/0054587 A1 * | 3/2008 | Wu | 280/202 |
| 2008/0174085 A1 * | 7/2008 | Hsu | 280/201 |
| 2008/0181799 A1 * | 7/2008 | Wu | 417/455 |
| 2009/0060766 A1 * | 3/2009 | Hawkins et al. | 417/545 |

* cited by examiner

*Primary Examiner*—Lesley Morris
*Assistant Examiner*—Marc A Scharich
(74) *Attorney, Agent, or Firm*—Larkin Hoffman Daly & Lindgren Ltd.; Thomas J. Oppold

(57) ABSTRACT

An adjustable length bicycle mountable hand pump. The pump includes a barrel having an internal cylinder within which a piston is reciprocatingly moveable. A piston rod connects to a piston at a proximal end and to a handle at a distal end. The handle is selectively, longitudinally, adjustably lockable relative to the barrel. The end of the handle is contoured to mate with a bicycle frame member. A head having a contoured portion mates with an opposing spaced bicycle frame member.

26 Claims, 7 Drawing Sheets

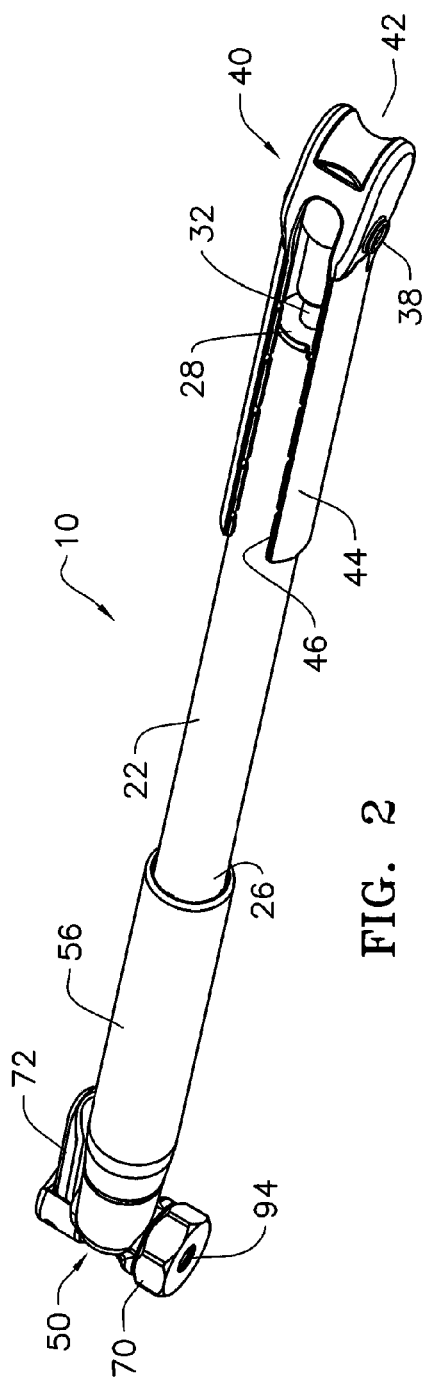
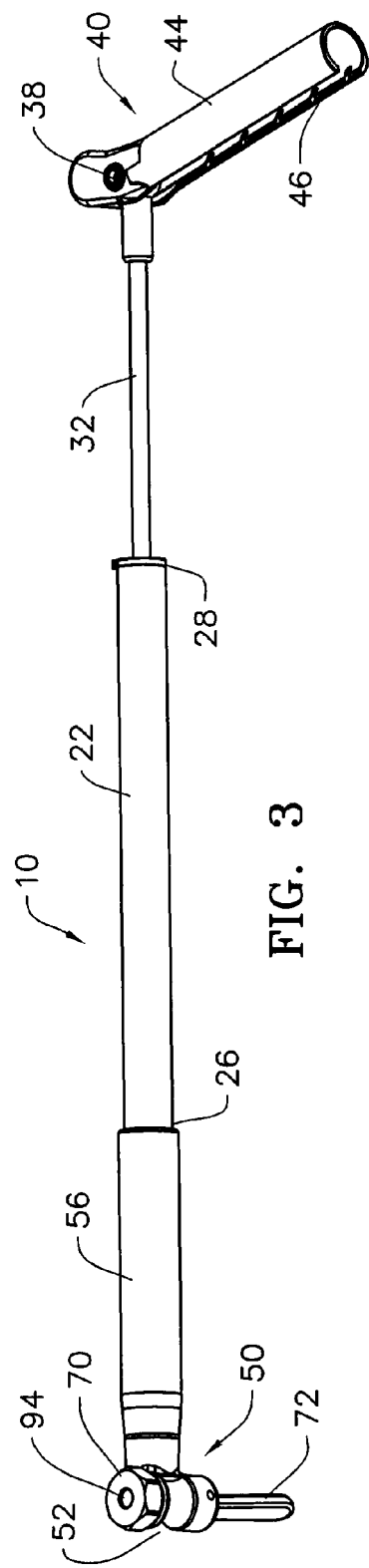
FIG. 2
FIG. 3

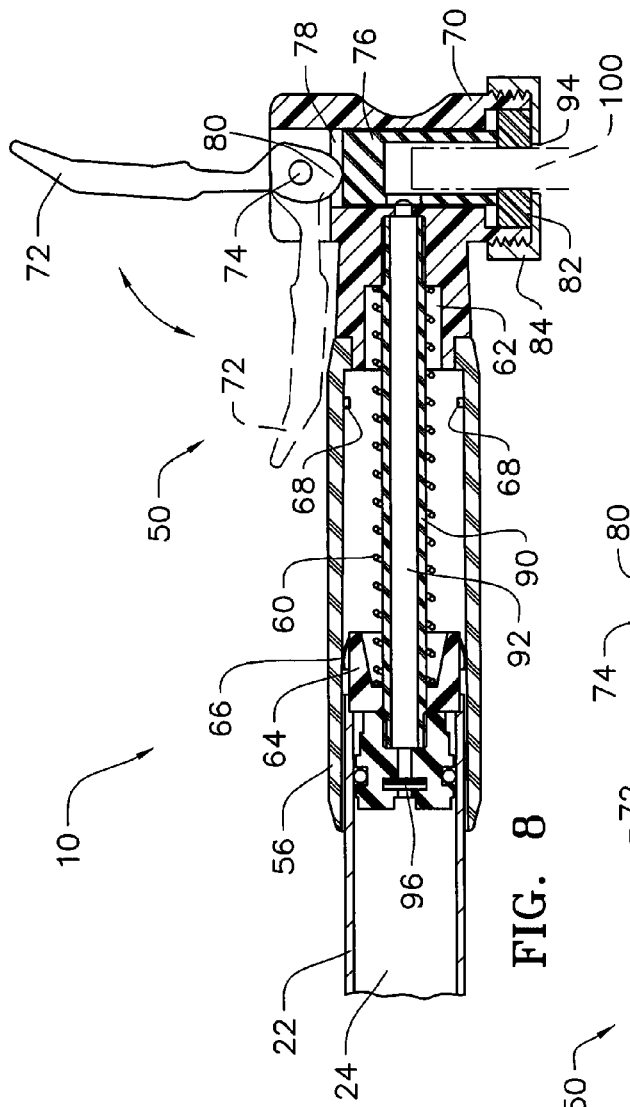
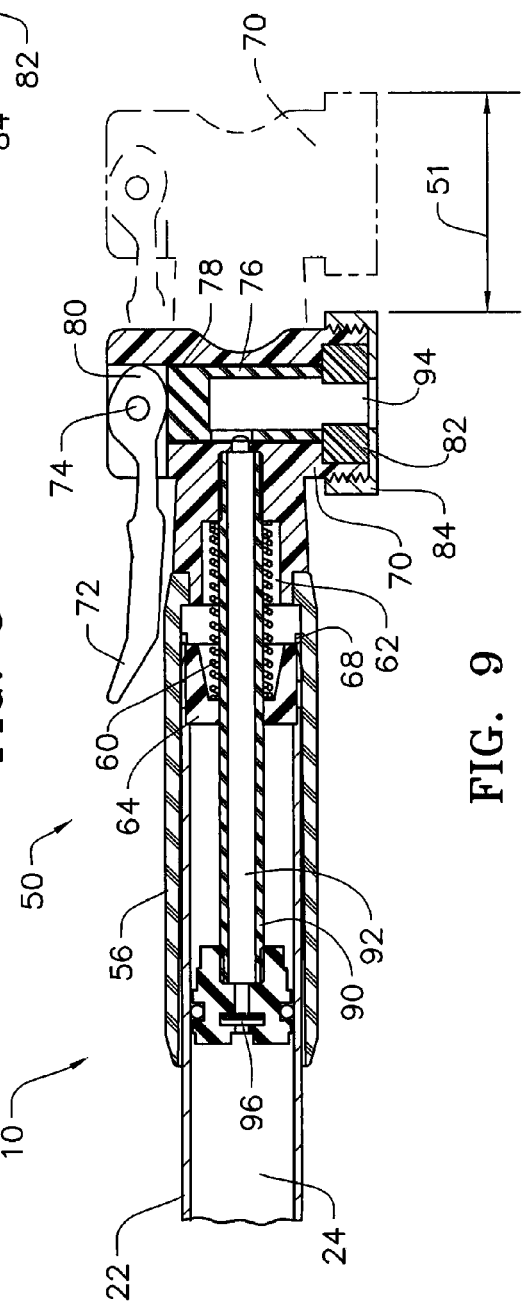
FIG. 8
FIG. 9

ADJUSTABLE LENGTH BICYCLE MOUNTABLE HAND PUMP

BACKGROUND

Hand pumps adapted to mount to the frame of a bicycle are well known in the art. Most such hand pumps mount below the top tube of the bicycle frame and extend between the head tube and seat tube. One end of the pump usually includes a spring bias to exert a longitudinal outward force to keep the ends of the pump in firm contact with the head tube and seat tube. To remove the pump from the bicycle frame, one end of the pump is pulled or compressed inwardly toward the other end thereby shortening the pump so that it can be removed from between the bicycle frame members. Heretofore, such pumps permitted only a limited range of length adjustment, thereby requiring manufacturers and bicycle shops to produce and stock a number of different length pumps to accommodate the different sizes of bicycle frames.

Additionally, with some prior art hand pumps, the biasing spring is disposed such that the user has to overcome the force of the biasing spring during the downstroke of the pumping action. Such positioning of the spring unnecessarily requires the user to exert extra effort when using the pump.

Accordingly, there is a need in the industry for a bicycle mountable hand pump that is essentially a "one-size-fits-all" pump to accommodate most if not all adult bicycle frame sizes thereby eliminating the need to produce and stock a number of different sizes of pumps. Furthermore, there is a need for such a one-size-fits-all hand pump that does not require the user to overcome any spring biasing force when using the pump to inflate a tire.

BRIEF DESCRIPTION OF THE DRAWINGS

FIG. 2 is a perspective view showing the hand pump of FIG. 1 in the folded mounting position.

FIG. 3 is a perspective view showing the hand pump of FIG. 1 wherein the handle is in the unfolded working position.

FIG. 8 is an enlarged cross sectional view of the head of the hand pump of FIG. 7 but showing the head in the fully extended position.

FIG. 9 is an enlarged cross sectional view of the head of the hand pump of FIG. 7 showing the head in the most compressed or shortened position.

DETAILED DESCRIPTION

Figure 1:
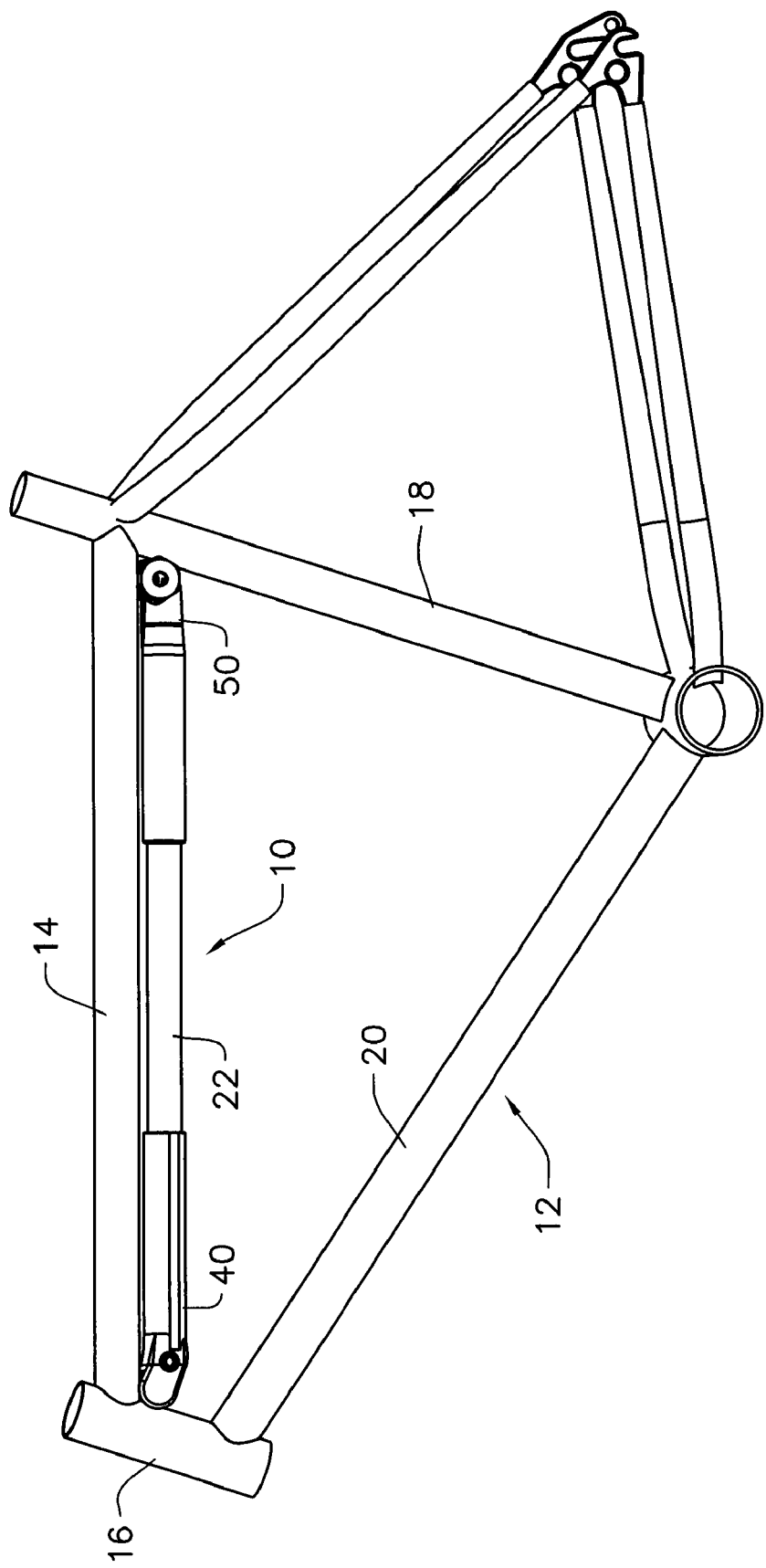
FIG. 1 illustrates a preferred embodiment of an adjustable length bicycle mountable hand pump in accordance with the present invention and showing the hand pump mounted on a bicycle frame.
Figure 4:
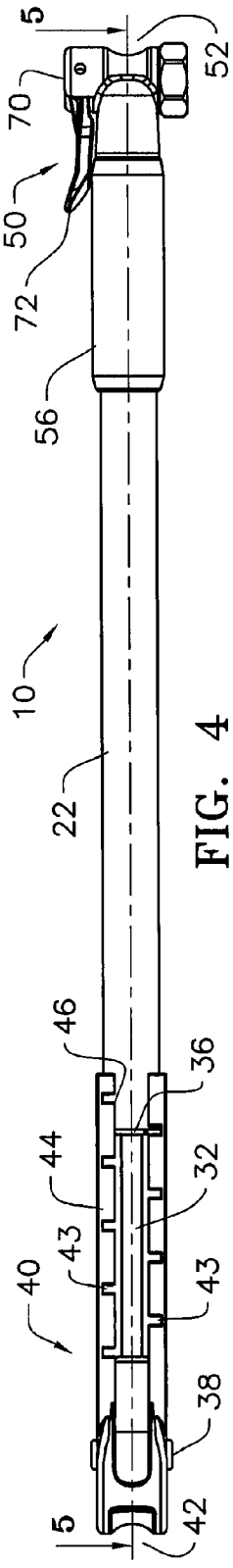
FIG. 4 is a side elevation view of the hand pump of FIG. 1 in the folded mounting position but in its most fully extended position.
Figure 5:
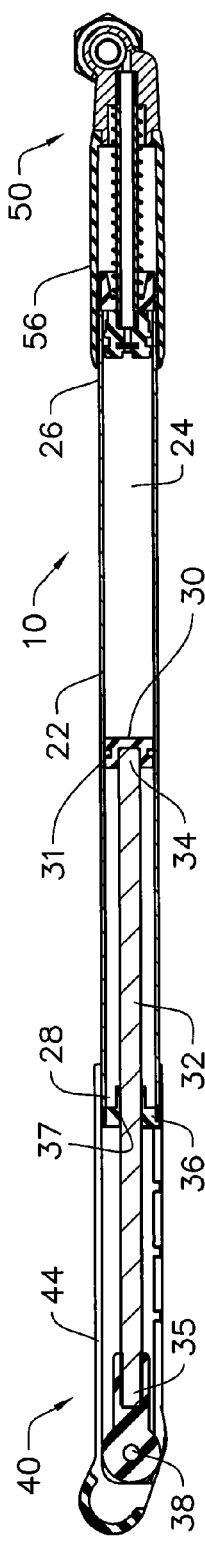
FIG. 5 is a cross-sectional view of the hand pump of FIG. 4 as viewed along lines 5-5 of FIG. 4.
Figure 6:
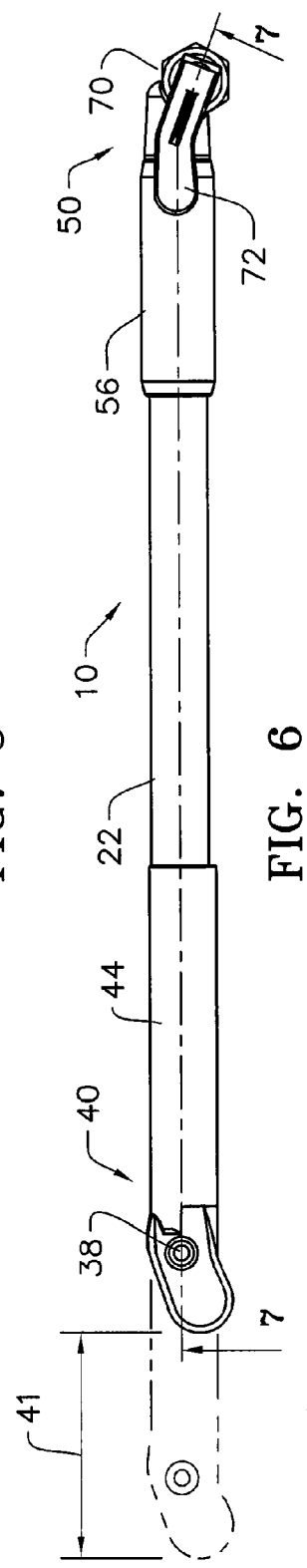
FIG. 6 is a top plan view of the hand pump of FIG. 1 in the folded mounting position but in its most fully shortened position.
Figure 7:
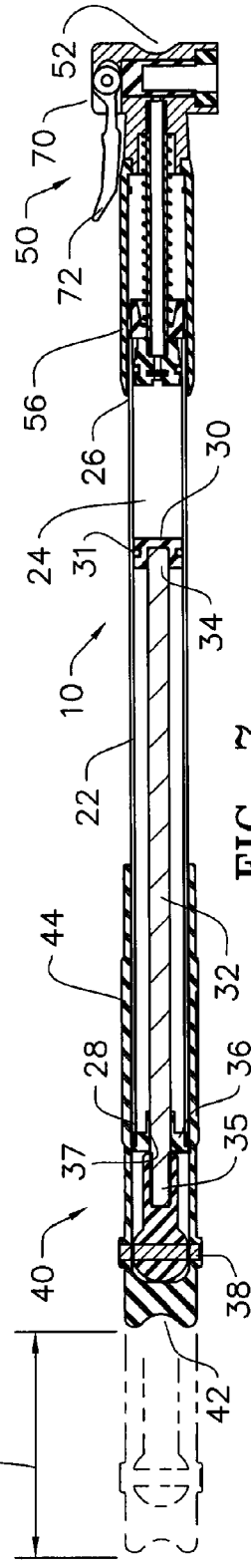
FIG. 7 is a cross-sectional view of the hand pump of FIG. 6 as viewed along lines 7-7 of FIG. 6.

Referring now to the drawings wherein like reference numerals identify corresponding or like parts throughout the several views, FIG. 1 illustrates a preferred embodiment of an adjustable length bicycle mountable hand pump in accordance with the present invention, designated generally by reference numeral 10. The hand pump 10 is shown mounted to a conventional bicycle frame 12 below the top tube 14 and extending between opposing sides of the head tube 16 and the seat tube 18. It should be appreciated, however, that the pump 10 may be mounted to any opposing spaced members of the bicycle frame 12, including, by way of example and without limitation, mounting the pump 10 adjacent the down tube 20 and extending between the head tube 16 and the seat tube 18, or adjacent the seat tube 18 and extending between the top tube 14 and the down tube 20.

Referring to FIGS. 2-7, the pump 10 includes a barrel 22 having an internal cylinder 24 with a first end 26 and a second end 28. A piston 30 is disposed within the cylinder 24. A deformable seal 31 is disposed around the outer periphery of the piston. The seal 31 deforms on the upstroke permitting air to enter the cylinder 24 around the deformed seal 31 between the cylinder wall and the piston 30. On the downstroke, the seal 31 seals the piston 30 within the cylinder 24 defining a compression chamber between the piston and the cylinder head cap 64. A piston rod 32 is connected at one end 34 to the piston 30. A distal end 35 of the piston rod 32 extends through an aperture 37 in the barrel end cap 36 and is connected to a handle 40. In the preferred embodiment, the handle 40 is pivotally movable about a pin 38 connecting the handle 40 and piston rod 32 so as to permit the handle to move between a folded frame mounting position (FIG. 2) and an unfolded working position (FIG. 3). However, it should be appreciated that the handle need not pivot to be operable, in which event the handle may be rigidly fixed to the piston rod. Because it is always desirable to minimize weight when bicycling, the barrel 22, piston 30 and piston rod 32 are all preferably fabricated from lightweight aluminum, plastic, composites or other suitably rigid, lightweight material. Likewise, the handle 40 is preferably made of a lightweight, substantially rigid, but yet somewhat resilient material (for reasons discussed later), such as nylon or other suitable lightweight plastic.

The pump 10 also includes a head 50. As best illustrated in FIGS. 2, 3, 4 and 7 the handle 40 and head 50 preferably include contoured portions 42, 52 adapted to mate with the spaced opposing first and second bicycle frame members as previously discussed. Because most bicycle frames are made of round tubular members, the preferred embodiment of the pump 10 shows the contoured portions 42, 52 with arcuate concave profiles. However, it should be appreciated that any other contour shape may be equally suitable depending on the shape or profile of the frame members comprising the bicycle frame 12.

In the preferred embodiment, wherein the handle 40 is pivotally movable between a folded mounting position (FIG. 2) and a working position (FIG. 3), the handle preferably includes a cylindrical portion 44 with an elongated cutout 46 extending substantially along its length to permit the handle 40 to fold down upon the barrel 22 to maintain the cylindrical profile of the pump and so as not to cause any obstruction to the biker when the pump 10 is mounted to the bicycle frame 12. The width of the cutout 46 is preferably less than the diameter of the barrel 22 such that the cutout 46 and/or cylindrical handle portion 44 are required to deform slightly to receive the barrel 22, thereby ensuring that the handle 40 does not unintentionally disengage from the barrel 22 when not in use.

To prevent the handle 40 from moving longitudinally relative to the barrel 22, the pump 10 preferably includes a longitudinal lock mechanism to longitudinally lock the handle 40 with respect to the barrel 22. Additionally, to provide a one-size-fits-all pump, it is preferably that the longitudinal locking mechanism permits the overall length of the pump to be adjustably fixed to approximate the distance between the bicycle frame members between which the pump is to mount. Thus, if the pump 10 is to be mounted to a smaller bicycle frame, the handle 40 is pushed toward the first end 26 causing the piston 30 and piston rod 32 to move downwardly within the cylinder 24 (i.e., to the right in FIG. 7) thereby shortening the overall length of the pump 10 before the handle is locked in place to the barrel. If, on the other hand, the pump 10 is to be mounted to a larger bicycle frame, the handle 40 is pulled toward the second end 28 causing the piston 30 and piston rod 32 to move upwardly within the cylinder 24 (i.e., to the left in FIG. 5) thereby lengthening the overall length of the pump 10 before the handle is locked in place to the barrel. This pump length adjustment by positioning of the handle 40 with respect to the barrel 22 is hereinafter referred to as the "handle adjustment distance" as designated by reference numeral 41 in FIG. 7.

Figure 10:
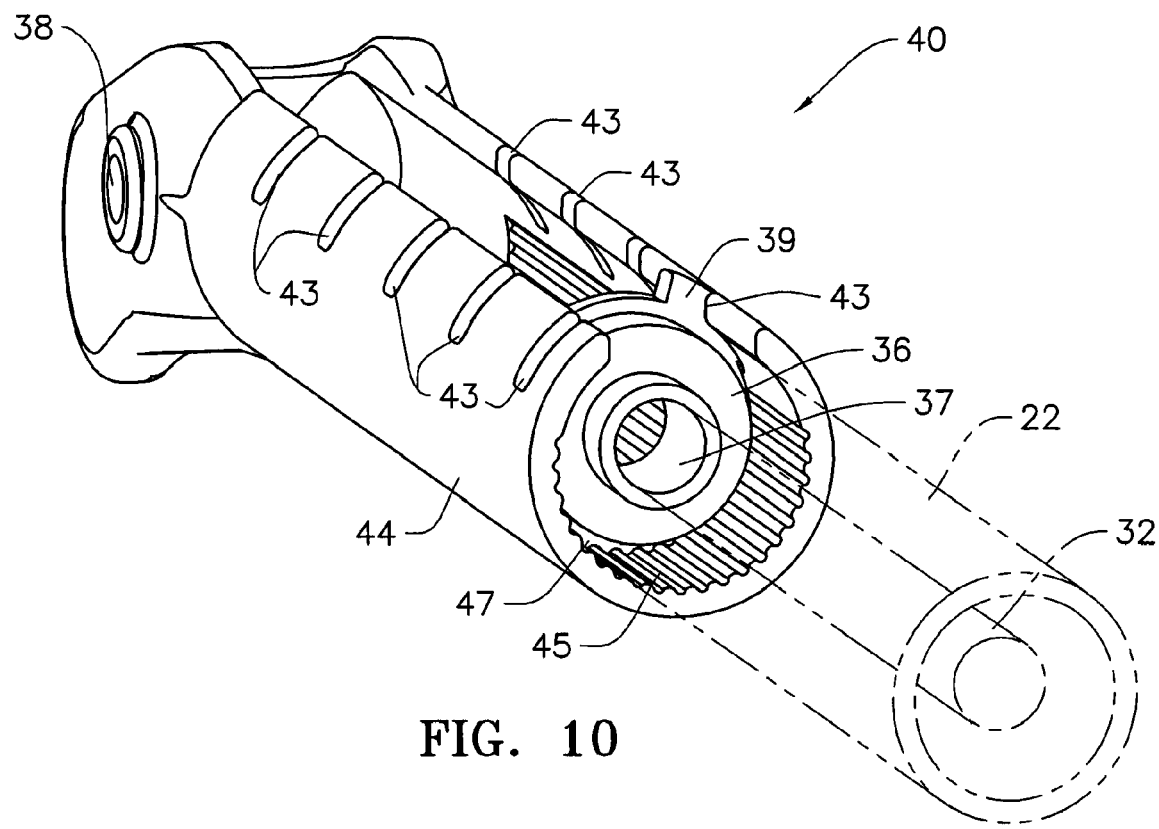
FIG. 10 is a perspective view of a preferred handle illustrating an embodiment of a preferred handle locking mechanism for the hand pump of the present invention.
Figure 11:
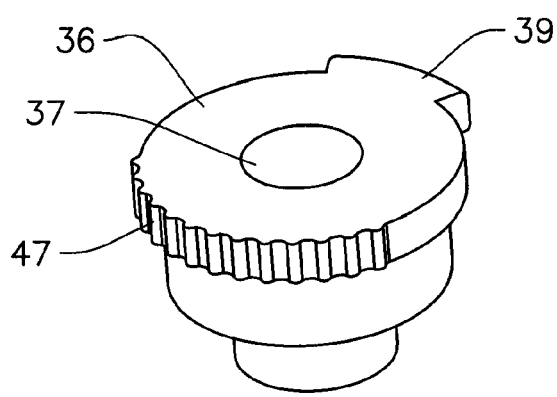
FIG. 11 is a perspective view of the barrel end cap for use with the handle locking mechanism of FIG. 10.

Referring to FIGS. 10 and 11, the handle 40 is preferably longitudinally locked to the barrel 22 by selective engagement of a detent 39 projecting from the barrel end cap 36 with one of a series of slots 43 disposed on either side of the cutout 46 of the handle 40. In the preferred embodiment, to prevent the detent 39 from inadvertently disengaging from the slots 43, such as when riding the bicycle over rough terrain, the interior surface of the cylindrical handle portion 44 and the rim of the barrel end cap 36 preferably include a series of complimentary teeth 45, 47 which when rotated relative to one another will removably lock the detent 39 within the selected slot 43.

Figure 12:
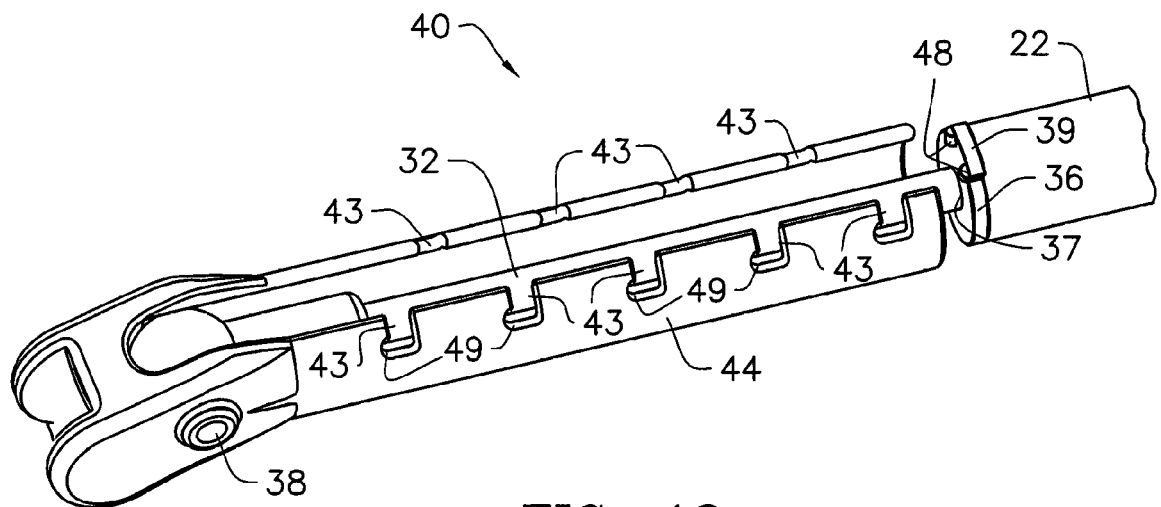
FIG. 12 is a perspective view of a preferred handle illustrating another embodiment of a handle locking mechanism for the hand pump of the present invention.
Figure 13:
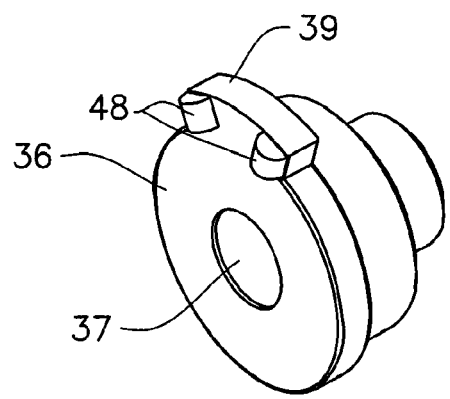
FIG. 13 is a detailed perspective view of an embodiment of the barrel end cap for the handle locking mechanism of FIG. 12
Figure 14:
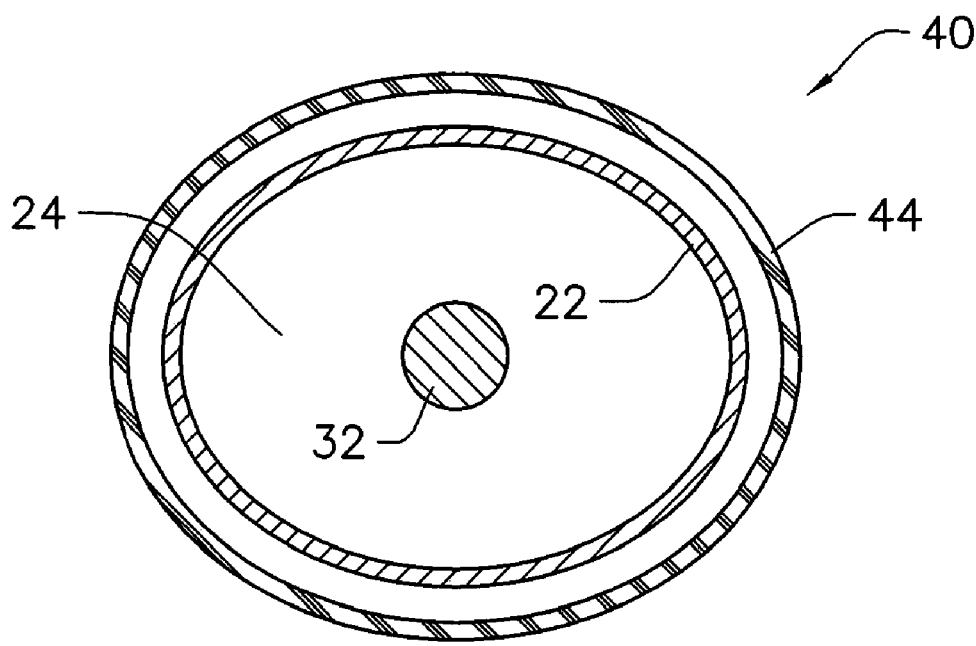
FIGS. 14 and 15 are exaggerated cross-sectional views of a handle and barrel illustrating a twist-lock handle locking mechanism as yet another embodiment of a handle locking mechanism for the hand pump of the present invention.
Figure 15:
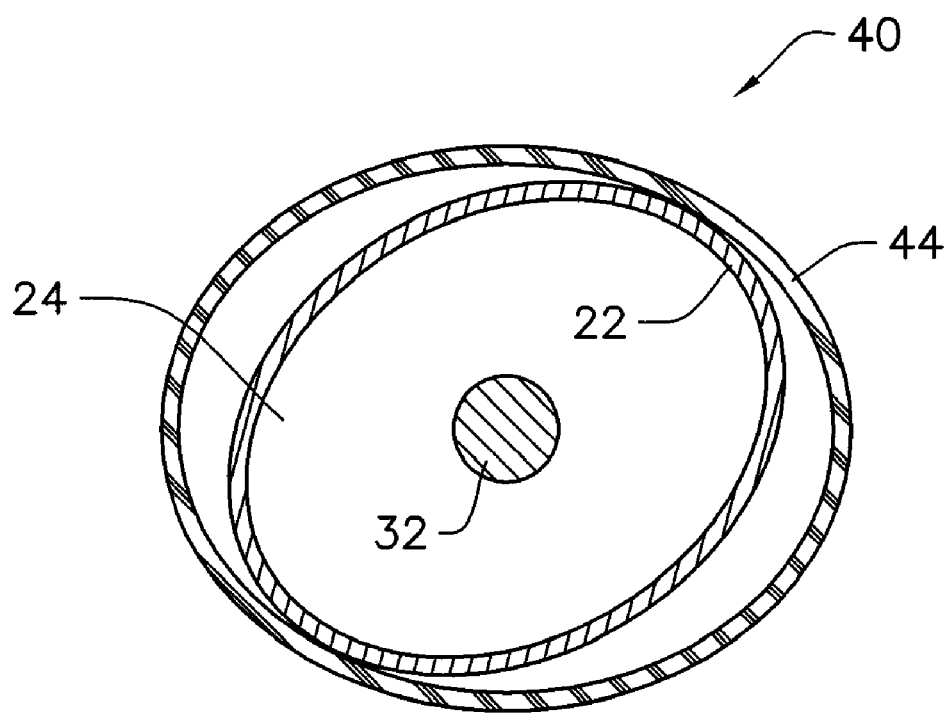

FIG. 12 illustrates an alternative embodiment for longitudinally locking the handle and barrel. Rather than incorporating interlocking teeth to retain the detent 39 of the barrel end cap 36 within the selected slot 43 as in FIGS. 10 and 11, instead, the detent 39 may incorporate tabs 48 which are received within a notch 49 at the base of the slot 43. FIG. 13 is an enlarged perspective view of the barrel end cap 36 better illustrating the tabs 48 on the detent 39. In yet another alternative embodiment, Velcro® straps or elastic bands (not shown) may be placed around the handle 40 to prevent the detent 39 from becoming disengaged from the slots 43. In yet another alternative embodiment, rather then mechanical engagement of interlocking elements, the handle and barrel may be frictionally locked. For example, the interior of the cylindrical handle portion 44 and/or the exterior of the barrel 22 may be coated with rubber or other material having a high coefficient of friction such that the cylindrical portion 44 of the handle 40 will not slide relative to the barrel 22 when the handle 40 is in the folded mounting position. In yet another alternative embodiment, a twist-lock may be incorporated as best illustrated in FIGS. 14 and 15 wherein the second end of the barrel 22 and handle portion 44 have complimentary obround shapes (exaggerated in FIGS. 14 and 15 for illustration purposes) such that when handle 40 and barrel 22 are rotated relative to one another the obround sides lockably engage as illustrated in FIG. 15 until being disengaged by rotation in the opposite direction. It should be appreciated that each of the above embodiments for longitudinally locking the handle 40 relative to the barrel 22 is applicable regardless of whether the handle is pivotally foldable about the distal end 35 of the piston rod 32 (as illustrated in FIGS. 2 and 3) or whether the handle 40 is fixed to the distal end 35 of the piston rod 32.

In addition to the handle adjustment distance 41, the overall length of the pump 10 is also preferably adjustable by the longitudinal movement of the head 50 with respect to the barrel 22. This longitudinal movement of the head 50 with respect to the barrel 22 is hereinafter referred to as the "head adjustment distance" as designated by reference numeral 51 in FIG. 9. In the preferred embodiment, the combined handle adjustment distance 41 and the head adjustment distance 51 enables a total length adjustment of approximately 13 cm thereby accommodating bicycles frames with lengths ranging from 43 cm to 56 cm between the head tube 16 and the seat tube 18 resulting in a substantially one-size-fits-all bicycle mountable hand pump.

In the preferred embodiment, the head 50 is preferably spring biased longitudinally outwardly relative to the barrel 22 so as to exert an outward force on the bicycle frame members between which the pump 10 is mounted to ensure that the pump 10 remains securely fixed in place on the bicycle frame 12. Accordingly, it should be appreciated that with the preferred embodiment, to mount the pump 10 to the bicycle frame 12, the handle 40 is pushed or pulled relative to the barrel 22 to adjust the length of the pump 10 so that its overall length is slightly longer than the distance between the bicycle frame members between which the pump is to be mounted. Once the desired length is achieved, the handle 40 is longitudinally locked relative to the barrel 22 as previously described. The head 50 and barrel 22 are then grasped and an inward force is exerted to overcome the spring bias to collapse the length of the pump so that it will fit between the opposing bicycle frame members. The compression force is slowly released and the contours 42, 52 on the ends of the pump are aligned with the opposing spaced bicycle frame members. The contours 42, 52 in cooperation with the spring bias ensures that the pump 10 remains fixed in place on the bicycle frame 12. To remove the pump from the frame, the head 50 and barrel 22 are grasped and an inward or compression force is exerted to reduce the overall length of the pump to where it is less than the distance between the frame members so that the contoured ends 42, 52 can be disengaged from the bicycle frame.

In the preferred embodiment, to permit the reciprocal movement of the head 50 relative to the barrel 22, the head 50 preferably includes a sleeve 56 into which the first end 26 of the barrel 22 is received. As best illustrated in FIGS. 8 and 9, a spring 60 is disposed within a bore 62 at one end of the sleeve 56 and abuts the cylinder head cap 64 at its other end. Stops 66 on the exterior periphery of the cylinder head cap 64 preferably prevent the barrel 22 and head 50 from separating due to the bias of the spring 60. Similarly an abutment 68 disposed within the interior periphery of the sleeve 56 prevents the barrel 22 from compressing too far within the sleeve 56. It should be noted that because the spring 60 is not incorporated into or disposed around the handle 40 or within the cylinder 24, the user is not required to overcome the bias of the spring on any downstroke or upstroke when the pump is being used.

Referring to FIGS. 8 and 9, the head 50 preferably includes a nozzle portion 70 adapted to receive a tire stem valve 100 (FIG. 8). A thumb lever 72 is preferably provided to removably lock the nozzle 70 onto the stem. In the preferred embodiment, the thumb lever 72 is pivotally connected to the head 50 by a pin 74. Disposed within the nozzle 70 is a peg 76 which is movable within an opening 78. One end of the thumb lever 72 includes a cam 80. When the thumb lever 72 is moved from the down position to the up position as shown in FIG. 8, the cam 80 forces the peg 76 downwardly within the opening 78. The downward movement of the peg 76 compresses a rubber o-ring gasket 82 against the bottom of the nozzle cap 84, thereby causing the gasket 82 to seal around the tire valve stem 100 by narrowing the central opening of the o-ring gasket 82. A tube 90 defines an air passage 92 extending between the nozzle aperture 94 and through the cylinder head cap 64 to communicate air from the compression chamber 24 of the barrel into the tire stem 100. A check valve 96 is preferably disposed along the air passage 92.

The foregoing description is presented to enable one of ordinary skill in the art to make and use the invention and is provided in the context of a patent application and its requirements. Various modification to the preferred embodiment of the apparatus and its method of use and the general principles and features described herein will be readily apparent to those of skill in the art. Thus, the present invention is not to be limited to the embodiments of the apparatus described above and illustrated in the drawing figures, but is to be accorded the widest scope consistent with the spirit and scope of the appended claims.

The invention claimed is:

1. An adjustable length hand pump removably mountable to a bicycle frame between opposing spaced first and second bicycle frame members, said hand pump comprising:
   a barrel having a longitudinal axis, an internal cylinder, a first end and a second end;
   a head disposed on and movable relative to said first end of said barrel between a normally axially biased extended position and a shortened axially compressed position;
   a piston moveable within said cylinder;
   a piston rod connected at a proximal end to said piston;
   a handle connected to a distal end of said piston rod, said handle selectively, longitudinally, adjustably lockable relative to said barrel such that a first length of the pump, from an end of said head in said normally axially extended position to an end of said handle in said selectively longitudinally locked position, is greater than a distance between the opposing spaced first and second bicycle frame members to which the pump is to be mounted;
   whereby, upon applying a force sufficient to compress said head to said shortened axially compressed position, a second length of the pump is less than the distance between the opposing spaced first and second bicycle frame members so as to permit the pump to be positioned therebetween, and, upon release of said force, the pump is removably mounted to the bicycle frame between the opposing spaced first and second bicycle frame members.

2. The adjustable length hand pump of claim 1 wherein said handle includes a contoured portion to mate with one of the opposing first and second bicycle frame members.

3. The adjustable length hand pump of claim 2 wherein said head includes a contoured portion to mate with the other one of the opposing first and second bicycle frame members.

4. The adjustable length hand pump of claim 3 wherein said contoured portion of said handle and said contoured portion of said head are disposed at an angle relative to said barrel longitudinal axis.

5. The adjustable length hand pump of claim 3 wherein said contoured portion of said handle and said contoured portion of said head are offset to one side of said barrel longitudinal axis.

6. The adjustable length hand pump of claim 1 wherein said handle is pivotally movable between a folded mounting position and an unfolded working position.

7. The adjustable length hand pump of claim 6 wherein said handle includes a cutout sized to frictionally receive said barrel when said handle is in said folded mounting position.

8. The adjustable length hand pump of claim 1 wherein said handle includes a cutout sized to frictionally receive said barrel.

9. The adjustable length hand pump of claim 1 wherein said head includes a sleeve within which said barrel first end is longitudinally movable.

10. The adjustable length hand pump of claim 9 wherein a spring is disposed within said sleeve to bias said head longitudinally outwardly relative to said barrel first end.

11. The adjustable length hand pump of claim 1 wherein said head includes a nozzle adapted to receive a tire stem.

12. The adjustable length hand pump of claim 11 wherein said head further includes an air passage to communicate air within said cylinder to said tire stem received within said nozzle.

13. The adjustable length hand pump of claim 12 wherein said head further includes a lever moveable between a first position and a second position, wherein in said second position, said nozzle is substantially sealed over said tire stem received therein.

14. The adjustable length hand pump of claim 1 further comprising a locking mechanism to provide said selective, longitudinal adjustment.

15. The adjustable length hand pump of claim 14 wherein said locking mechanism includes a detent proximate said second end of said barrel which cooperates with and is removably receivable in longitudinally spaced slots in said handle.

16. The adjustable length hand pump of claim 15 wherein said detent includes tabs receivable within notches in said longitudinally spaced slots.

17. The adjustable length hand pump of claim 15 wherein an interior surface of said handle and a barrel end cap include complimentary teeth which cooperate to removably retain said detent in a select one of said longitudinally spaced slots in said handle.

18. The adjustable length hand pump of claim 14 wherein said locking mechanism comprises frictional engagement of cooperating elements of said handle and said barrel.

19. The adjustable length hand pump of claim 18 wherein said cooperating elements include a non-cylindrical shaped portion of said barrel second end received within a complimentary non-cylindrical shaped handle portion, whereby upon rotation of said barrel relative to said handle, an interior surface of said non-cylindrical shaped handle portion frictionally engages with said non-cylindrical shaped portion of said barrel second end.

20. The adjustable length hand pump of claim 18 wherein said cooperating elements include an interior surface of said handle frictionally engaging an exterior surface of said barrel second end.

21. An adjustable length hand pump removably mountable to a bicycle frame between opposing spaced first and second bicycle frame members, said hand pump comprising:

a barrel having a longitudinal axis, an internal cylinder, a first end and a second end;

a piston moveable within said cylinder;

a piston rod connected at a proximal end to said piston;

a handle connected to a distal end of said piston rod, said handle selectively, longitudinally, adjustably lockable relative to said barrel; and a head having a sleeve within which said barrel first end is longitudinally moveable and biased longitudinally outwardly relative to said barrel first end.

22. The adjustable length hand pump of claim 21 wherein a spring is disposed within said sleeve to bias said head longitudinally outwardly relative to said barrel first end.

23. An adjustable length hand pump removably mountable to a bicycle frame between opposing spaced first and second bicycle frame members, said hand pump comprising:

a barrel having a longitudinal axis, an internal cylinder, a first end and a second end;

a piston moveable within said cylinder;

a piston rod connected at a proximal end to said piston;

a handle connected to a distal end of said piston rod, said handle selectively, longitudinally, adjustably lockable relative to said barrel; and a head;

said handle including a contoured portion to mate with one of the opposing first and second bicycle frame members;

said head including a contoured portion to mate with the other one of the opposing first and second bicycle frame members; and wherein said contoured portion of said handle and said contoured portion of said head are offset to one side of said barrel longitudinal axis.

24. An adjustable length hand pump removably mountable to a bicycle frame between opposing spaced first and second bicycle frame members, said hand pump comprising:

a barrel having a longitudinal axis, an internal cylinder, a first end and a second end;

a piston moveable within said cylinder;

a piston rod connected at a proximal end to said piston;

a handle connected to a distal end of said piston rod;

a head;

a locking mechanism to selectively, longitudinally, adjustably lock said handle relative to said barrel, said locking mechanism including a detent proximate said second end of said barrel, said detent including tabs which cooperates with and are removably receivable in longitudinally spaced slots in said handle.

25. An adjustable length hand pump removably mountable to a bicycle frame between opposing spaced first and second bicycle frame members, said hand pump comprising:

a barrel having a longitudinal axis, an internal cylinder, a first end and a second end;

a piston moveable within said cylinder;

a piston rod connected at a proximal end to said piston;

a handle connected to a distal end of said piston rod;

a head;

a locking mechanism to selectively, longitudinally, adjustably lock said handle relative to said barrel, said locking mechanism including a detent proximate said second end of said barrel which cooperates with and is removably receivable in longitudinally spaced slots in said handle, said interior surface of said handle and a barrel end cap including complimentary teeth which cooperate to removably retain said detent in a select one of said longitudinally spaced slots in said handle.

26. An adjustable length hand pump removably mountable to a bicycle frame between opposing spaced first and second bicycle frame members, said hand pump comprising:

a barrel having a longitudinal axis, an internal cylinder, a first end and a second end;

a piston moveable within said cylinder;

a piston rod connected at a proximal end to said piston;

a handle connected to a distal end of said piston rod;

a head;

a locking mechanism to selectively, longitudinally, adjustably lock said handle relative to said barrel, said locking mechanism comprising frictional engagement of cooperating elements of said handle and said barrel, wherein said cooperating elements include a non-cylindrical shaped portion of said barrel second end received within a complimentary non-cylindrical shaped handle portion, whereby upon rotation of said barrel relative to said handle, an interior surface of said non-cylindrical shaped handle portion frictionally engages with said non-cylindrical shaped portion of said barrel second end.

* * * * *